May 12, 1931.　　　F. D. POWELL　　　1,804,642
APPARATUS FOR CUTTING INDEX ELEMENTS
Filed May 10, 1928　　6 Sheets-Sheet 1
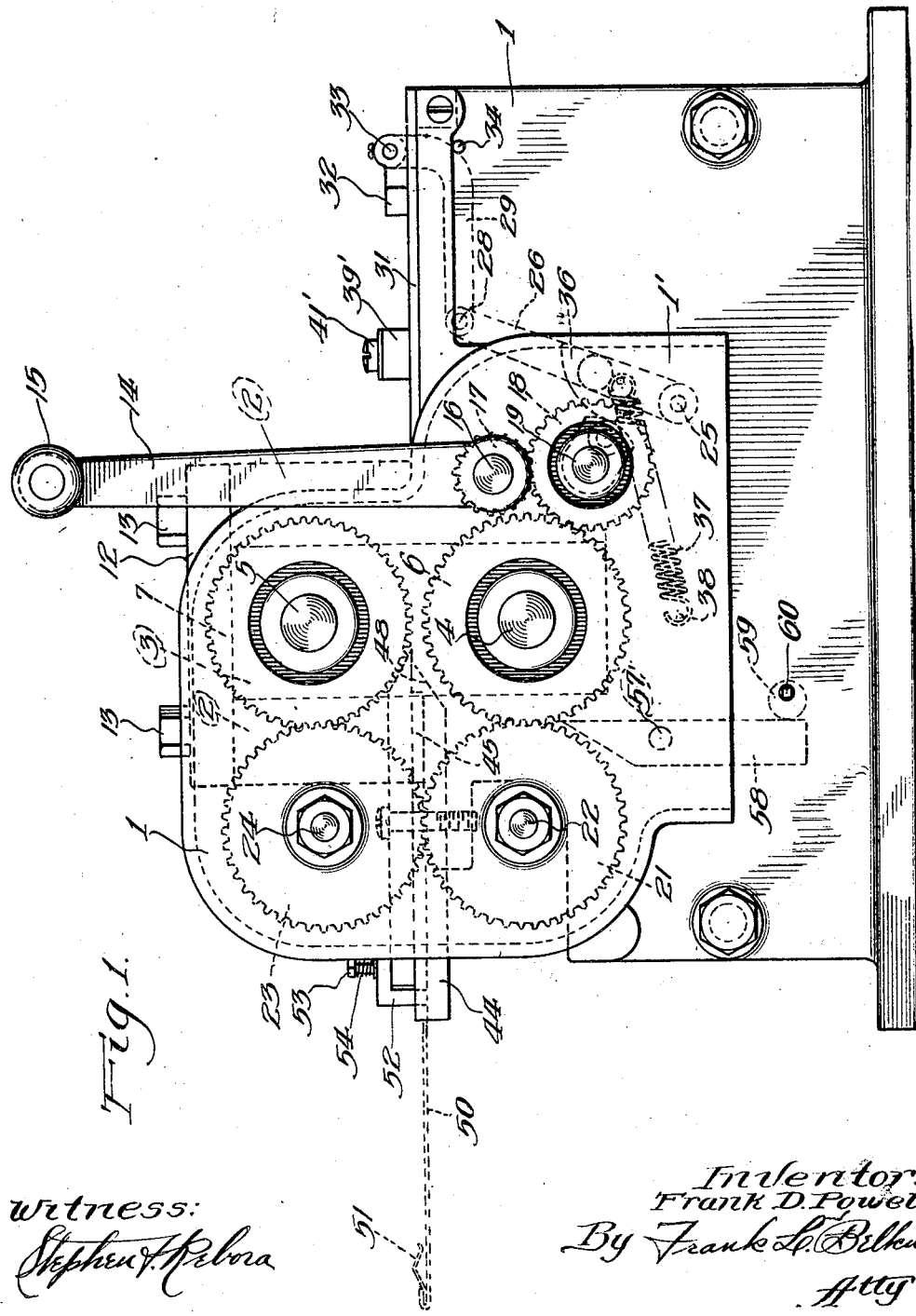

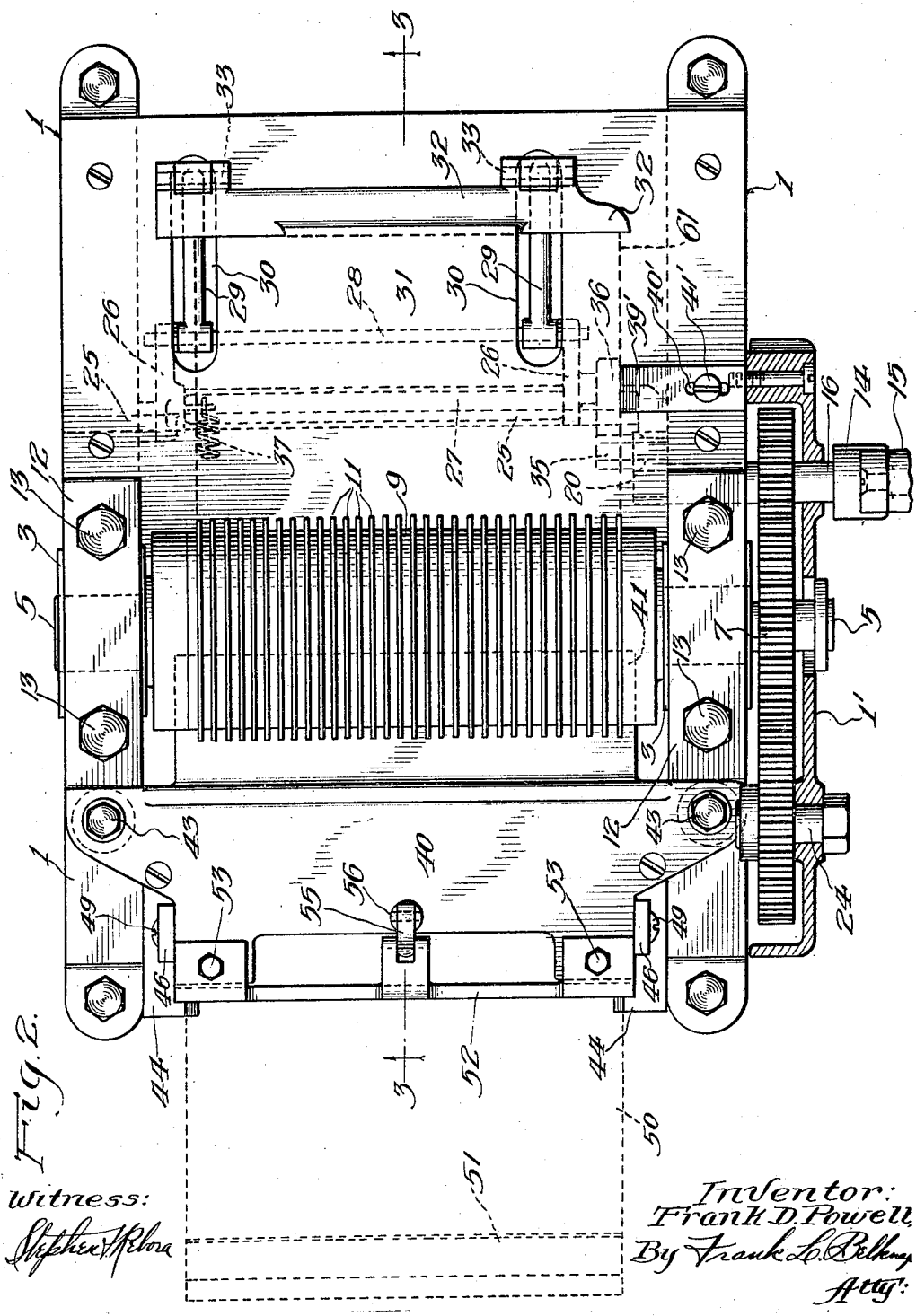

May 12, 1931.  F. D. POWELL  1,804,642
APPARATUS FOR CUTTING INDEX ELEMENTS
Filed May 10, 1928   6 Sheets-Sheet 3
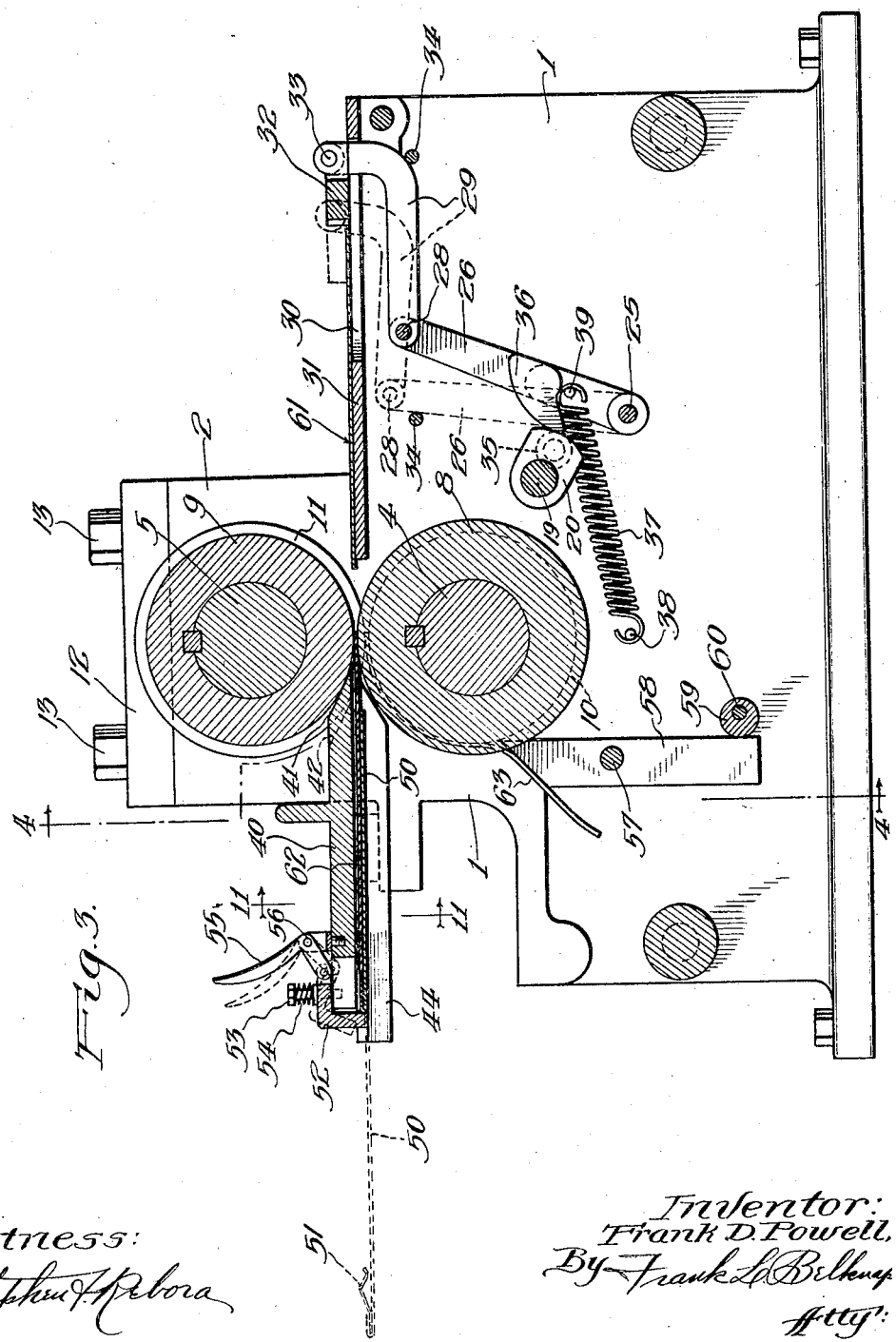
Inventor:
Frank D. Powell,
By Frank L. Belknap
Atty.
Witness:
Stephen A. Rebora

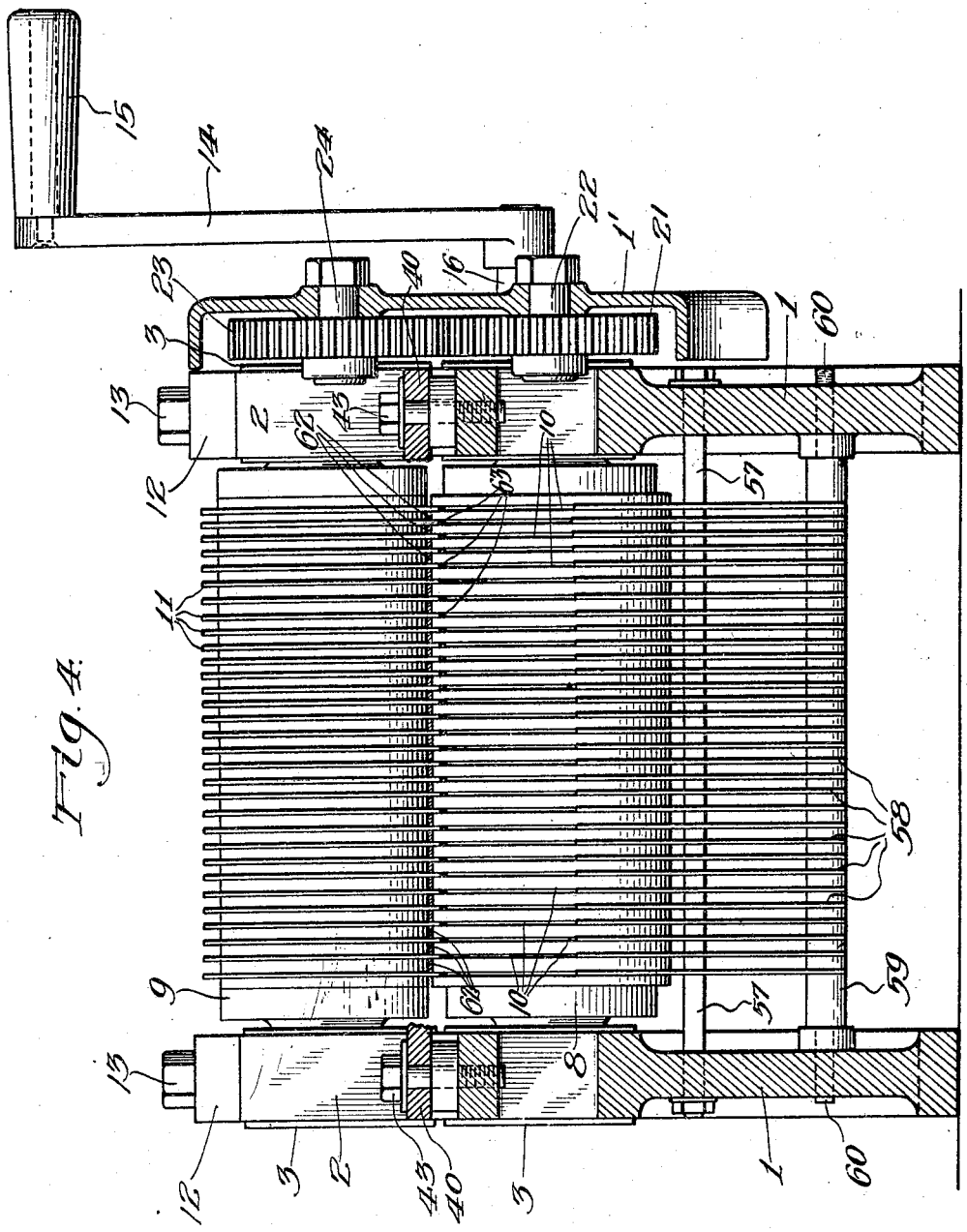

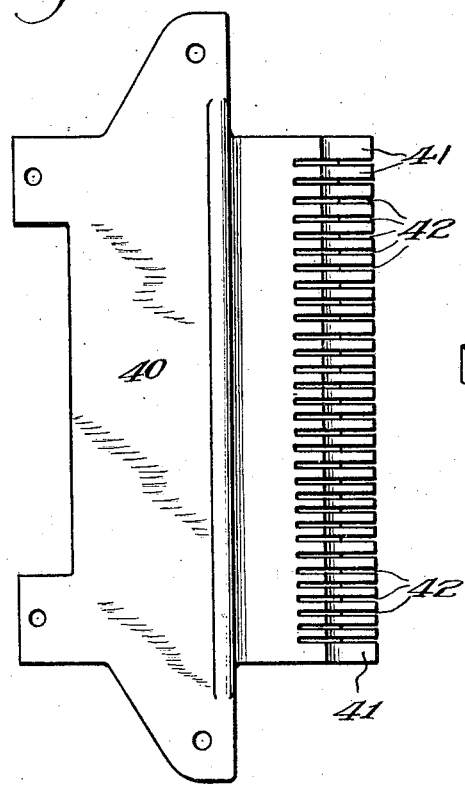
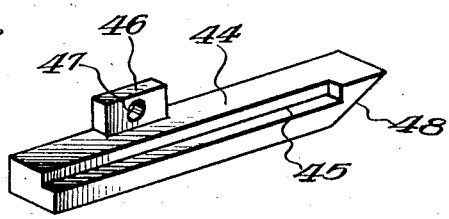
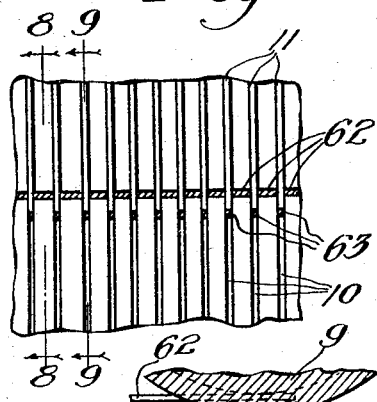
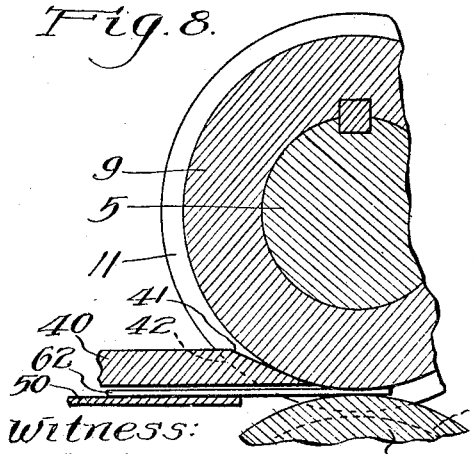
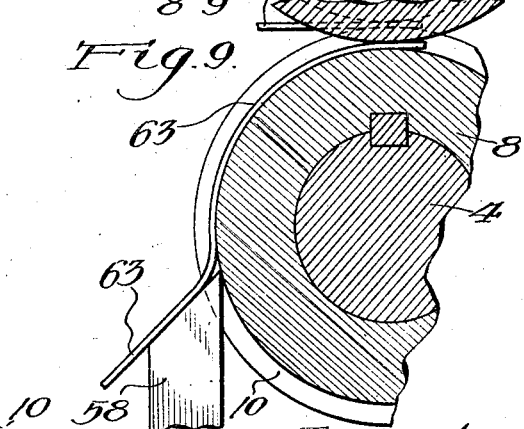

May 12, 1931.  F. D. POWELL  1,804,642
APPARATUS FOR CUTTING INDEX ELEMENTS
Filed May 10, 1928    6 Sheets-Sheet 6
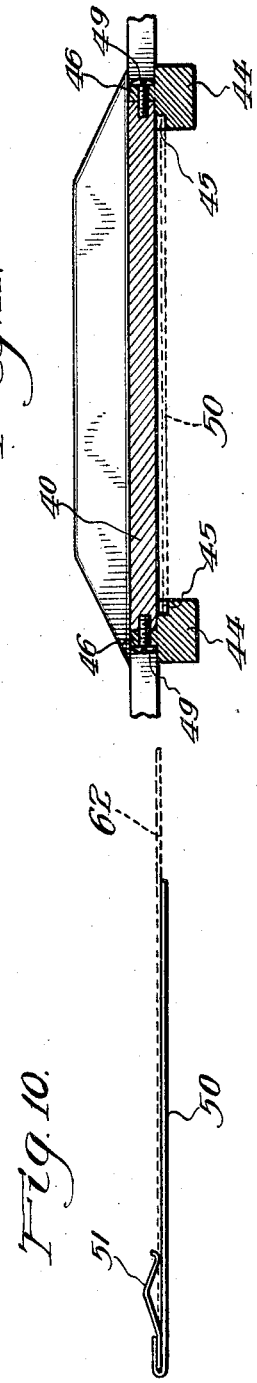
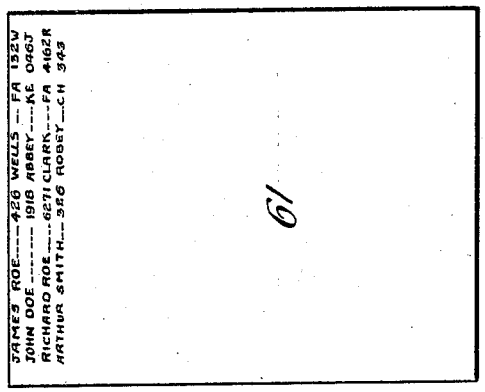
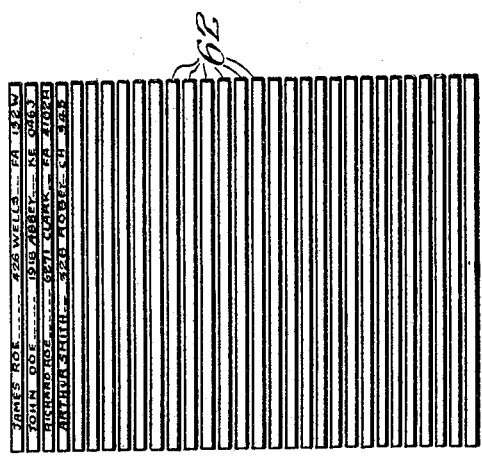
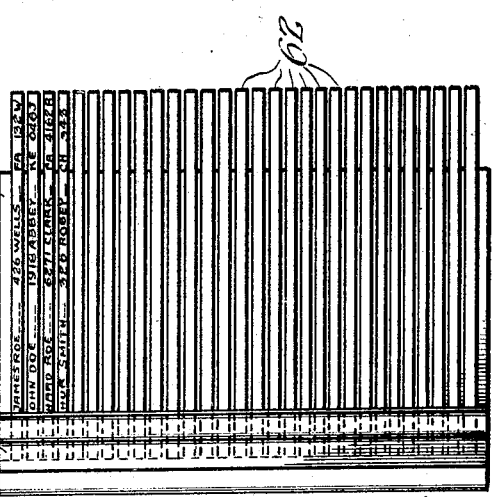
Witness:
Stephen V. Pelsora
Inventor:
Frank D. Powell
By Frank L. Belknap
Atty.

Patented May 12, 1931

1,804,642

UNITED STATES PATENT OFFICE

FRANK D. POWELL, OF CHICAGO, ILLINOIS, ASSIGNOR TO ACME CARD SYSTEM COMPANY, OF CHICAGO, ILLINOIS, A CORPORATION OF ILLINOIS

APPARATUS FOR CUTTING INDEX ELEMENTS

Application filed May 10, 1928. Serial No. 276,518.

The present invention relates more particularly to apparatus for simultaneously cutting a plurality of narrow strips, each containing index data such as a name, address and/or other data from a large sheet bearing such data in spaced parallel lines.

It has been proposed to print, multigraph or otherwise impose upon a sheet of suitable several material, such as cardboard or the like, in spaced parallel lines, index data which it is desired to have appear on a plurality of index strips, and thereafter cut the sheet into individual index strips by means of a cutting apparatus, the cutting being made at predetermined points between the lines so that the desired data will appear upon the strips formed.

Several objections have presented themselves in the use of such apparatus, chief among them being the difficulty of retaining the strips in order relative to the data thereupon after they are severed from the sheet and the fact that, when the data is printed, multigraphed or otherwise imposed upon the sheet the natural space necessarily left between the lines of type must be removed from the strips in order that the latter may be as narrow as possible, i. e. slightly wider than the height of the data thereon, so that the strips will occupy as little space as possible in the frames in which they are mounted for use. It may be here pointed out that it is not practical to print or multigraph the lines close enough together so as to prevent any waste. Heretofore considerable difficulty has been experienced in trimming and separating from the strips the unprinted waste portions.

It is an object of the present invention to provide apparatus especially adapted to cut individual narrow strips, each containing index data, from a large sheet bearing such data in spaced parallel lines of type.

It is a further object of the present invention to provide apparatus which overcomes many of the objections hertofore experienced in apparatus adapted to cut index strips from sheet material bearing index data in spaced parallel lines.

Briefly described, the apparatus of the present invention comprises a pair of shearing rolls adapted to shear a sheet of material, such as cardboard, wood veneer or the like, into individual index strips, the shearing rolls being adapted to trim the strips to a width preferably substantially equal to the height of the data thereupon, means being provided for stripping and separately removing the waste portions between adjacent strips. An automatic guiding means is provided to introduce the sheet of material to be cut into index strips in proper alignment relative to the shearing rolls, and a removable tray is positioned adjacent the opposite side of the shearing rolls to receive the strips cut from the sheet of material and maintain same in order relative to the data thereupon.

As a feature of the present invention the trimming of the blank spaces from the strips will permit a maximum number of the strips to be mounted in a given frame.

As a further feature of the present invention, the removable tray will retain the strips in the order the data appeared on the sheet of material, thus expediting filing of the strips in the frames.

As another feature of the present invention, the automatic guiding means will assure the proper introduction of the sheet of material to the shearing rolls, the guiding means being adapted to bear against the edge of the sheet of material just sufficient to move it into engagement with the shearing rolls.

Other objects, features and advantages of the present invention will be more apparent from the following detailed description.

In the drawings, Fig. 1 is a side elevational view of a cutting device embodying the features of the present invention.

Fig. 2 is a top plan view of the device illustrating the gear housing in section.

Fig. 3 is a vertical sectional view taken on line 3—3 of Fig. 2 looking in the direction of the arrows.

Fig. 4 is a staggered vertical sectional view taken on line 4—4 of Fig. 3 looking in the direction of the arrows.

Fig. 5 is a top plan view of the strip guiding means.

Fig. 6 is a perspective view of one of the grooved shelves for supporting the removable strip receiving tray.

Fig. 7 is a fragmentary side elevational view of the shearing rolls.

Fig. 8 is a cross sectional view taken on line 8—8 of Fig. 7 looking in the direction of the arrows.

Fig. 9 is a cross sectional view taken on line 9—9 of Fig. 7 looking in the direction of the arrows.

Fig. 10 is an edge view of the strip receiving tray.

Fig. 11 is a cross sectional view taken on line 11—11 of Fig. 3 looking in the direction of the arrows.

Fig. 12 is a top view of the strip receiving tray containing the strips formed from the sheet shown in Fig. 14.

Fig. 13 is a top plan view of the strips formed from the sheet shown in Fig. 14.

Fig. 14 is a top view of a sheet of material bearing data prior to its being formed into strips.

Referring more in detail to the drawings, 1 designates a suitable metallic frame which may preferably be formed in several parts adapted to be bolted together.

Each side of the frame 1 may be provided with two spaced upright parallel members 2 (Fig. 1) between which may be positioned journal blocks 3. In the blocks 3 may be journalled lower shaft 4 and upper shaft 5 on which may be respectively keyed the gears 6 and 7 and the shearing rolls 8 and 9. The roll 8 may be provided with a series of spaced grooves 10 adapted to engage in close fitting relation with a similar series of spaced blades 11 carried by the roll 9.

A block 12, secured by means of cap screws 13, may be employed to retain the blocks 3 between the upright members 2. A number of shims (not shown) may be placed between the blocks 3 to maintain the rolls 8 and 9 in proper relationship relative to each other.

A crank lever 14 having a handle 15 may be keyed to a shaft 16, the latter being journalled in the frame 1 and having keyed to it a pinion gear 17. A gear 18 adapted to mesh with the gears 6 and 17 may be keyed to a shaft 19, the latter being journalled in the frame 1 and having keyed to it a cam 20. A gear 21 may mesh with the gear 6 and may be journalled on a suitable shaft 22, the latter being mounted in the gear housing 1'. A similar gear 23 may mesh with the gears 7 and 21 and may be journalled on a suitable shaft 24, the latter being mounted in the gear housing 1'.

Thus, when the crank 14 is operated, the gear 17 will drive gear 18, the gear 18 will drive gear 6, the gear 6 will drive gear 21, the gear 21 will drive gear 23, and the gear 23 will drive gear 7, whereby the rolls 8 and 9 will be rotated in opposite directions. This particular type of construction has been found advantageous to permit the rolls 8 and 9 to be vertically adjustable, it being obvious that the gears 6 and 7 may be moved a considerable distance in a vertical direction without becoming disengaged from the gears 21 and 23.

Describing now the guiding mechanism: The ends of a transverse rod 25 (Figs. 2 and 3) may be carried in opposite sides of the frame 1 and there may be journalled on rod 25 one or more upright arms 26, the latter being preferably integrally connected to a transverse rod 27 (Fig. 2). The upper ends of the arms 26 may carry a transverse rod 28 upon which may be journalled one or more angular arms 29, the ends of which may project through the slots 30 in a stationary plate 31 and may be pivotally connected to a guide member 32 by means of one or more pins 33, the plate 31 being secured to the frame 1 in a horizontal position adjacent the rolls 8 and 9.

One or more pins 34 may be employed to restrict the movement of the arms 26 and 29. The cam 20 may be provided with a roller 35 adapted to operatively engage a cam-faced lug 36 carried by one of the arms 26. A coiled spring 37 may be anchored to the frame at 38 and secured to one of the arms 26 at 39 to exert a constant tension or pull on the above described assembly to move the guide member 32 toward the rolls 8 and 9 when the roller 35 is not engaged with the cam-faced lug 36. A gauge member 39' (Fig. 2) provided with a slot 40' may be adjustably mounted relative to the plate 31 by means of the set screw 41'.

A second stationary plate 40 (Fig. 5) having a bevelled edge 41 provided with a plurality of slots 42 spaced the same distance apart as the blades 11 upon the roll 9, may be secured to the frame 1 by means of the bolts 43, in a horizontal position. The lower surface of the plate 40 may preferably be substantially in or slightly above the tangent plane of the lowermost point of the roll 9. Blocks 44 (Fig. 6) each having a groove 45, a boss 46 provided with a hole 47, and a beveled end 48, may be mounted on opposite sides of the plate 40 by means of the screws 49 (Fig. 2), the grooves 45 being so positioned as to retain the strip receiving tray 50 (Figs. 3 and 10) in substantially a parallel position and slightly spaced below the plate 40. Thus, the tray 50 may be readily removed from the machine when desired. This tray 50 may be provided with a spring clip member 51 positioned on its surface adjacent a lateral edge thereof to form a continuous clip adapted to retain the strips when engaged therewith.

A locking member 52 (Fig. 3) may extend below the edge of the plate 40 to engage the edge of the tray 50 whereby the latter is retained in engagement with the grooves 45, the locking member 52 being so mounted on the bolts 53 that the springs 54 retain it in locking position. A handle 55, pivotally mounted at 56, may be operatively associated with the said locking member 52 to move it against the force of the springs to an unlocked position.

A transverse rod 57 (Fig. 1) may have its ends mounted in opposite sides of the frame 1 and may have a plurality of scrapers 58 (Figs. 3 and 9) pivotally mounted thereon in spaced relationship. These scrapers 58 may be spaced on the rod 57 so as to permit the bevelled ends thereof to engage the grooves 10 upon the roll 8 in the manner illustrated. A second transverse rod 59, adapted to engage the lower portion of the scrapers 58 may be eccentrically mounted upon the threaded screws 60, whereby the scrapers may be adjusted relative to the roll 8, as may be desired.

In the operation of the device, 61 (Fig. 14) designates a sheet of paper, fibre, cardboard or the like bearing the data desired to appear on index strips in spaced parallel lines. This data may be printed, multigraphed, or otherwise imposed on the face of the sheet 61 as shown, the lines being spaced a predetermined distance apart. Figs. 1, 2 and 3 show the machine in position ready for operation.

The strip receiving tray 50 is engaged with the grooves 45 and slid into position for receiving the index strips, the locking member 52 being caused to lock the tray and prevent it from moving out of the proper position as illustrated in Fig. 3. When the machine is in position to begin operation, the cam 20 bears against the cam face of the lug 36, causing the assembly of levers to retain the guide member 32 at its maximum distance away from the rolls 8 and 9, the surface bearing the data being disposed upwardly, one of the lateral edges of the same being caused to squarely abut the guide member 32 and an end edge being caused to contact the guide member 39'. The crank-lever 14 is then rotated in a counter clockwise direction, the operator preferably placing one of his hands upon the sheet 61 to retain the edges of the latter in proper engagement with the guides 32 and 39'.

As the hand-crank 14 is moved, the gear 18 is caused to be rotated in a clock-wise direction causing the shaft 19 carrying the came 20 to be rotated. When the roller 35 of the cam 20 disengages the lug 36, the lever 26 will be functioned by the spring 37, causing the guide 32 to move toward the rolls 8 and 9, carrying with it the sheet 61, whereby the latter is fed to the shearing rolls 8 and 9.

By the use of the spring 37 to actuate the guide 32, the sheet 61 will be guided to the rolls 8 and 9 and guided while passing between the rolls, irrespective of the speed with which the sheet 61 is drawn by the said rolls. Thus, the guide 32 serves only as a true guide member, and does not force the sheet 61 through the shearing rolls.

As the sheet passes between the rolls the knives 11 shear it to form the strips 62 (Figs. 12 and 13) and the waste portions 63 (Figs. 7 and 9), the latter being the space between the rows of data upon the sheet 61.

As the waste portions 63 are cut from the sheet they are forced into the grooves 10 by the blades 11. As the strips 62 emerge from between the rolls, they pass upon the tray 50, the plate 40 preventing them from being carried upwardly between the knives 11, and also preventing them from becoming disarranged, as the space between the tray 50 and plate 40 is just sufficient to permit the strips to pass freely. Just before all of the sheet 61 has passed between the rolls the ends of the strips 62 slide under the spring clip-member 51 on the tray 50, being forced to slide thereunder by the rolls 8 and 9. The tray 50 is so positioned that the strips 62 will be securely engaged by the spring member 51 when the sheet 61 has completely passed between the rolls. The waste portion 63 is carried within the grooves 10 (where it was forced by the blades 11) until it is engaged by the scrapers 58 whereby it is removed and disposed of as may be desired.

The crank 14 is further rotated (if necessary) until the cam 20 has re-engaged the lug 36 whereby the guide 32 is restored to its former position. The tray 50 containing the strips 62 may be removed and an empty one put in its place and the machine is ready to receive another sheet 61 to be cut into index strips.

I claim as my invention:

1. A machine comprising in combination, means for shearing from a sheet bearing data thereon in spaced parallel lines the portion between the lines of data to leave the data bearing strips of predetermined width each bearing a line or more of such data, means for actuating such shearing means, means for separating and removing as waste the unprinted waste strips sheared from between adjacent data bearing strips, removable means for separately collecting the data bearing strips comprising receiving means adapted to retain the strips in order relative to the data thereupon.

2. A machine comprising in combination, means for shearing from a sheet bearing data thereon in spaced parallel lines the portions between the lines of data to leave the data bearing strips of predetermined width each bearing a line or more of such data, means for actuating such shearing means, means for separating and removing as waste the unprinted waste strips sheared from between adjacent data bearing strips, removable means for separately collecting the data bearing strips comprising receiving means adapted to retain the strips in order relative to the data thereupon, and means for feeding the sheet to the shearing means in proper alignment relative thereto.

3. A machine comprising in combination, means for shearing from a sheet bearing data thereon in spaced parallel lines the portions between the lines of data to leave the data bearing individual strips of predetermined width each bearing a line or more of such data, means for automatically feeding the sheet to the shearing means in proper alignment relative thereto, means for separating and removing as waste the non-data bearing strips sheared from between adjacent data bearing strips, and means for receiving the data bearing strips, said latter means being adapted to retain the strips in order relative to the data thereupon.

4. A machine comprising in combination, a pair of rotatably driven shearing rolls, adapted to shear a sheet bearing data thereon in spaced parallel lines into strips of predetermined width each bearing a line or more of such data, one of which rolls is provided with spaced grooves and the other of which rolls is provided with spaced knives complemental to said grooves, and means registering with said grooves for separating and removing as waste the non-data bearing strips between adjacent lines of data, removable means for collecting data bearing strips comprising a removable tray disposed adjacent the discharge side of said rolls adapted to receive and retain the severed data bearing strips in order relative to the data thereupon.

5. In combination, means for shearing a unit sheet into a plurality of parallel strips, and means for positively retaining said strips collectively in a similar unit severed sheet after shearing, said latter means comprising a movable tray and strip clamping means operatively associated with said tray.

In testimony whereof I affix my signature.

FRANK D. POWELL.